United States Patent Office 2,941,086
Patented June 14, 1960

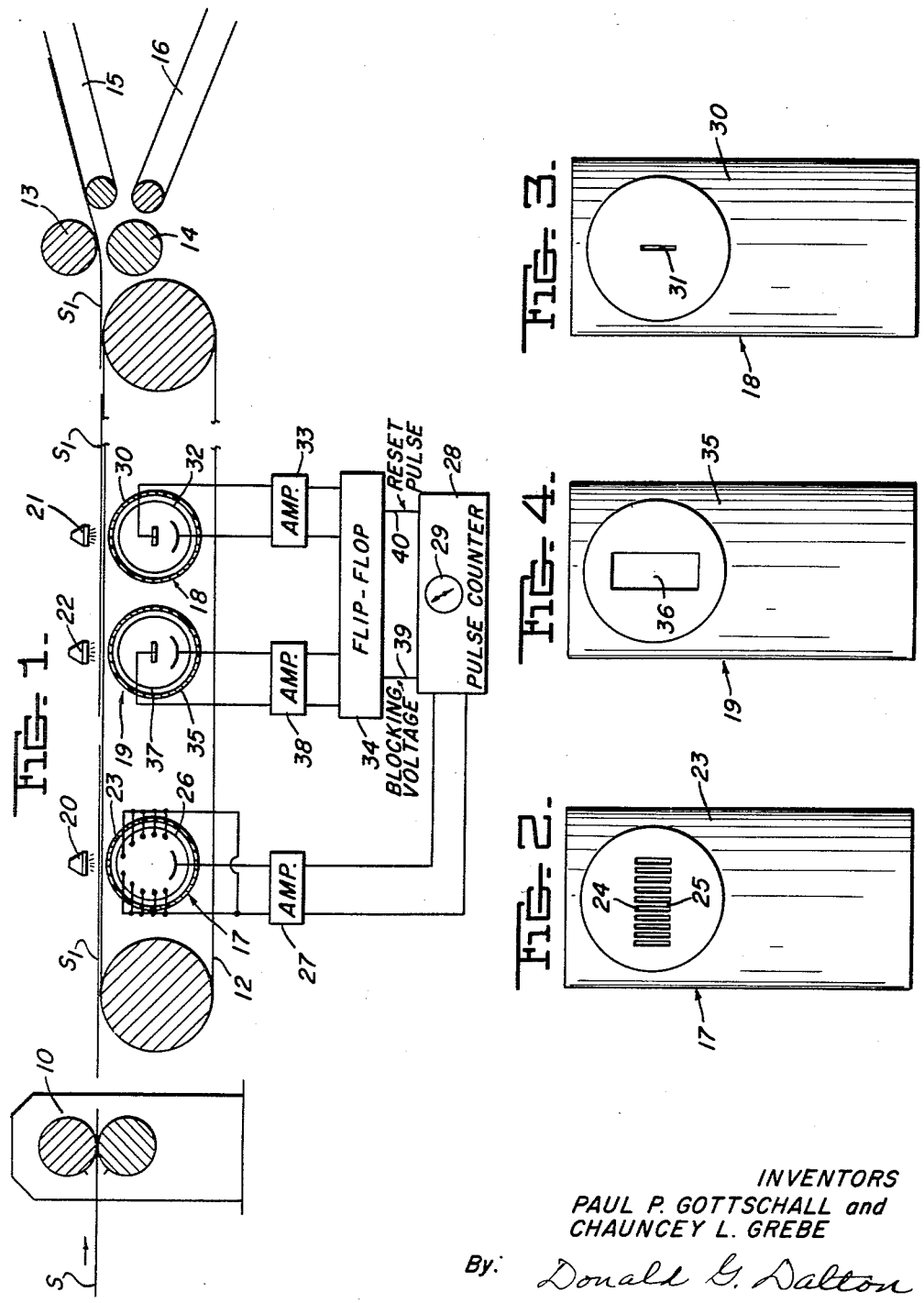

2,941,086
LINEAR MEASURING DEVICE

Paul P. Gottschall and Chauncey L. Grebe, Concord, Calif., assignors to United States Steel Corporation, a corporation of New Jersey Filed June 11, 1957, Ser. No. 664,988

6 Claims. (Cl. 250—219)

This invention relates to an improved device for visually indicating a linear dimension of moving articles.

The device is particularly useful in a shear line in which a flying shear cuts continuous strip into individual sheets, where the device furnishes an immediate indication of the length of each sheet. Thus the device enables an operator to make minor adjustments in the shear mechanism to assure that it cuts sheets accurately to the desired length. Nevertheless, the device has general application for checking a linear dimension of articles moving along a conveyor or the like, and the invention is not limited to use in any specific environment.

An object of the invention is to provide an improved measuring device which utilizes instantaneously responding electronic means for indicating a dimension of each article in a rapidly moving line of articles without interfering with their movement.

A further object is to provide an improved measuring device which affords the foregoing advantages and which displays each indication long enough for an operator to ascertain whether it is within the prescribed range and then automatically resets itself for measuring the next article.

A more specific object is to provide an improved measuring device which includes an electronic pulse counter, photoelectric means responsive to the passing of one edge of an article for transmitting a series of pulses to said counter, photoelectric trigger means responsive to the passing of the other edge for blocking further pulses, and photoelectric means responsive to the passing of an edge of the next article for resetting the counter, the pulse count furnishing an indication of a dimension of the article.

In accomplishing these and other objects of the invention, we have provided improved details of structure, a preferred form of which is shown in the accompanying drawing, in which:

Figure 1 is a diagrammatic side elevation not to scale of a shear line equipped with a measuring device constructed in accordance with our invention;

Figure 2 is a top plan view of the photoelectric pulsing or measuring head embodied in our device;

Figure 3 is a top plan view of the trigger head embodied in our device; and

Figure 4 is a top plan view of the reset head embodied therein.

Figure 1 shows a portion of a shear line which includes a conventional flying shear 10, a power driven belt-type conveyor 12, conventional upper and lower magnetizable rolls 13 and 14 at the exit end of said conveyor, and conveyors 15 and 16 beyond said rolls. A continuous strip S, in this instance of magnetic material, feeds into the shear which cuts it into individual sheets $S_1$. The conveyor 12 carries sheets $S_1$ away from the shear and travels slightly faster than the uncut strip to space the sheets a few inches apart. Normally the upper roll 13 is magnetized and the lower roll 14 demagnetized to direct prime sheets to conveyor 15, but this relation can be reversed through suitable control means not shown to direct defective sheets to conveyor 16. This structure constitutes a typical environment in which the device of our invention can be used, but is not part of our invention and hence is not described in greater detail.

In accordance with our invention, a photoelectric measuring or pulsing head 17, a photoelectric trigger head 18 and a photoelectric reset head 19 are mounted under the carrying flight of conveyor 12 flush with the surface of its belts. Light sources 20, 21 and 22 are mounted above the conveyor in positions to cast light beams at the respective heads 17, 18 and 19. The measuring head 17 is mounted for adjustment longitudinally of the conveyor near the entry end thereof. The trigger head 18 is spaced beyond the measuring head a distance approximately equal to a sheet length, as hereinafter explained. The reset head 19 is spaced beyond the measuring head a distance somewhat less than a sheet length.

As shown in Figure 2, the measuring head 17 includes an opaque case 23, in the upper face of which are mounted a plurality of alternating transparent windows 24 and opaque separators 25. In the illustration there are ten windows and nine separators, each having a thickness of about 0.007 inch. The windows conveniently are of a plastic material such as that sold under the trade name "Lucite," while the separators can be of brass shim stock. As the trailing edge of a sheet moves over the measuring head, the windows are exposed successively to light from the source 20, whereby the intensity of light admitted to the interior of the case 23 increases in steps corresponding in number to the number of windows. The case houses a multiplier phototube 26, such as the type commonly designated "931A," which transmits a pulse with each light increment. The multiplier phototube is connected to a conventional amplifier 27 and thence to a conventional pulse counter 28, such as that known as a "Berkeley Dual Preset Electronic Counter." The counter includes an indicator 29 for showing the number of pulses received during any interval in which it is set for counting.

As shown in Figure 3, the trigger head 18 includes an opaque case 30, whose upper face contains a single narrow window 31, preferably similar to one of the windows 24. The case 30 houses a phototube 32, which is connected through a conventional amplifier 33 to a conventional flip-flop or bistable multivibrator 34. As shown in Figure 4, the reset head 19 includes an opaque case 35, whose upper face contains a window 36. This last window conveniently can be somewhat wider than the windows in the measuring and trigger heads 17 and 18. The case 35 houses a phototube 37, which is connected through a conventional amplifier 38 to the flip-flop 34.

As is well known in the art, a flip-flop has two stable current-conducting conditions and it can be changed from one to the other by an outside stimulus. In our device the current conduction path through the flip-flop 34 changes when the leading edge of a sheet $S_1$ passes over the window 31 of the trigger head 18 and changes back when the leading edge of the next sheet passes over the window 36 of the reset head 19. In each instance the resulting loss of conduction through the phototube 32 or 37 acts through the respective amplifier 33 or 38 to furnish the external stimulus for changing the flip-flop. The flip-flop has a connection 39 to the pulse counter 28 for supplying a blocking voltage and another connection 40 thereto for supplying reset pulses. When the current conduction path changes in response to the leading edge of a sheet passing over the trigger head 18, the flip-flop commences to transmit a negative blocking voltage via the connection 39 to the pulse counter and thus stops further counting of the pulses. When the path changes back in response to the leading edge of the next sheet passing over the reset head 19, the flip-flop transmits a reset pulse via the connection 40 to the counter to return it to a zero setting and enable it to resume counting pulses.

In operation, the position of the measuring head 17 is adjusted so that its middle separator 25 is spaced from window 31 of the trigger head 18 a distance exactly equal to the desired length of sheets $S_1$. When conveyor 12 carries a sheet $S_1$ to a position where its leading edge covers window 36 of the reset head 19, the pulse counter 28 is set to commence counting, as already explained. When the conveyor carries this sheet to a position where its trailing edge commences to uncover successive windows 24 of the measuring head 17, the photo multiplier tube 26 sends a pulse to the counter for each window uncovered. The counter registers these pulses on its indicator 29 until the conveyor carries the sheet farther to a position where its leading edge covers window 31 of the trigger head 18. Thereupon the counter ceases to register further pulses, but continues to display the count already reached until it is next reset. Thus the count is displayed for an interval equal to that required for the conveyor to travel approximately a sheet length, long enough for an operator to determine whether sheets are being cut accurately. Sheets cut accurately to length produce a count equal to half the number of windows 24 of the measuring head, in this instance five. Longer or shorter sheets produce a correspondingly smaller or larger count.

From the foregoing description it is seen that our device affords a simple but accurate means for determining a linear dimension of rapidly moving articles without in any way interfering with their movement. The device is devoid of moving mechanical parts, but instead relies exclusively on electronic means which respond almost instantaneously. It is also seen that numerous variations are possible, such as connecting the pulse counter 28 with the magnetizable rolls 13 and 14 to divert off-length sheets. It may also be possible to reverse the positions of the heads so that the leading edges of sheets cooperate with the measuring head. We have not illustrated details of the photomultiplier, amplifiers, counter and flip-flop embodied in our device for the reason that per se these parts are well-known and not of our invention.

While we have shown and described only a single embodiment of the invention, it is apparent that modifications may arise. Therefore, we do not wish to be limited to the disclosure set forth but only by the scope of the appended claims.

We claim:

1. A device for measuring a linear dimension of each article of a succession of moving articles comprising means for transmitting a series of pulses while an edge of each article transverse to the direction of movement is moving past, pulse counting means connected to said transmitting means, trigger means connected to said counting means and spaced from said transmitting means by approximately the dimension of an article for stopping operation of said counting means when the opposite transverse edge of an article passes, and means connected to said counting means for resetting it when a transverse edge of a succeeding article passes.

2. A device for measuring a linear dimension of each article of a succession of moving articles comprising first photoelectric means for transmitting a series of pulses while an edge of each article transverse to the direction of movement is moving past, electronic pulse counting means connected to said first photoelectric means, trigger photoelectric means connected to said counting means and spaced from said first photoelectric means by approximately the dimension of the article for stopping operation of said counting means when the opposite transverse edge of an article passes, and reset photoelectric means connected to said counting means for resetting it when a transverse edge of a succeeding article passes.

3. A device for measuring a linear dimension of each article of a succession of moving articles comprising means for transmitting a series of pulses while an edge of each article transverse to the direction of movement is moving past, pulse counting means connected to said transmitting means, trigger means spaced from said transmitting means by approximately the dimension of the article, reset means spaced from said transmitting means, a flip-flop connected to said trigger means and said reset means, means connecting said flip-flop to said counting means for transmitting a blocking voltage thereto when the opposite transverse edge of the article moves past said trigger means, and means connecting said flip-flop to said counting means for transmitting a resetting pulse thereto when a transverse edge of the succeeding article moves past said reset means.

4. A device for measuring a linear dimension of each article of a succession of moving articles comprising first photoelectric means for transmitting a series of pulses while an edge of each article transverse to the direction of movement is moving past, electronic pulse counting means connected to said first photoelectric means, trigger photoelectric means spaced from said first photoelectric means by approximately the linear dimension of the article, reset photoelectric means spaced from said first photoelectric means, a flip-flop connected to said trigger and reset photoelectric means, means connecting said flip-flop to said counting means for transmitting a blocking voltage thereto when the opposite transverse edge of the article moves past said trigger photoelectric means, and means connecting said flip-flop to said counting means for transmitting a resetting pulse thereto when a transverse edge of the succeeding article moves past said reset photoelectric means.

5. The combination, with a conveyor adapted to carry a succession of articles, of a device for measuring each article for a dimension aligned with the direction of conveyor travel comprising first photoelectric means supported adjacent said conveyor for transmitting a series of pulses while an edge of an article transverse to the direction of conveyor travel is moving past, electronic pulse counting means connected to said first photoelectric means, trigger photoelectric means supported adjacent said conveyor and spaced from said first photoelectric means by approximately the dimension of the article and connected to said counting means for stopping operation thereof when the opposite transverse edge of the article passes, and reset photoelectric means supported adjacent said conveyor and connected to said counting means for resetting it when a transverse edge of a succeeding article passes.

6. A device for measuring a linear dimension of each article of a succession of moving articles comprising a measuring head having a series of windows for admitting light in increments while the trailing edge of an article is moving past and a multiplier phototube acted on by light transmitted through said windows for transmitting a pulse in response to each light increment, electronic pulse counting means connected to said phototube, trigger photoelectric means connected to said counting means and spaced from said measuring head by approximately the dimension of the article for stopping operation of said counting means when the leading edge of the article passes, and reset photoelectric means connected to said counting means for resetting it when the leading edge of the succeeding article passes.

References Cited in the file of this patent

UNITED STATES PATENTS 2,171,362     Gulliksen _____ Aug. 29, 1939

(Other references on following page)

UNITED STATES PATENTS

| | | | |
|---|---|---|---|
| 2,406,299 | Koulicovitch | Aug. 20, 1946 |
| 2,494,441 | Hillier | Jan. 10, 1950 |
| 2,573,405 | Clark | Oct. 30, 1951 |
| 2,612,994 | Woodland et al. | Oct. 7, 1952 |
| 2,640,152 | Hartwig | May 26, 1953 |
| 2,694,804 | Wagner | Nov. 16, 1954 |
| 2,788,519 | Caldwell | Apr. 19, 1957 |
| 2,848,921 | Koulikovitch | Aug. 26, 1958 |

FOREIGN PATENTS

| | | | |
|---|---|---|---|
| 915,155 | Germany | July 15, 1954 |